(12) United States Patent
Ichinohe (10) Patent No.: US 11,079,087 B2
(45) Date of Patent: Aug. 3, 2021

(54) VEHICLE LAMP (71) Applicant: KOITO MANUFACTURING CO., LTD., Tokyo (JP)

(72) Inventor: Fumitaka Ichinohe, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/314,154

(22) PCT Filed: Jun. 6, 2017

(86) PCT No.: PCT/JP2017/020986
§ 371 (c)(1),
(2) Date: Dec. 28, 2018

(87) PCT Pub. No.: WO2018/003428
PCT Pub. Date: Jan. 4, 2018

(65) Prior Publication Data
US 2019/0203905 A1   Jul. 4, 2019

(30) Foreign Application Priority Data
Jun. 29, 2016 (JP) .............................. JP2016-129240

(51) Int. Cl.
*F21S 43/239* (2018.01)
*F21S 43/14* (2018.01)
(Continued)

(52) U.S. Cl.
CPC ............ *F21S 43/239* (2018.01); *F21S 43/14* (2018.01); *B60Q 1/0011* (2013.01); *B60Q 3/62* (2017.02);
(Continued)

(58) Field of Classification Search
CPC ...... F21S 43/239; F21S 43/243; F21S 43/235; F21S 43/236; F21S 43/241; F21S 43/249; F21S 43/14; F21S 41/24; F21V 7/0091
See application file for complete search history.

(56) References Cited

U.S. PATENT DOCUMENTS 6,565,244 B1    5/2003  Murphy et al.
7,290,906 B2 *  11/2007 Suzuki ................. B60Q 1/2696
                                                           362/511
(Continued)

FOREIGN PATENT DOCUMENTS

DE   10 2006 008 199 A1   8/2007
EP      2 541 128 A2      1/2013
(Continued)

OTHER PUBLICATIONS

Search Report dated Sep. 5, 2017 by the International Searching Authority in counterpart International Patent Application No. PCT/JP2017/020986 (PCT/ISA/210) English translation.
(Continued)

*Primary Examiner* — Alexander K Garlen
*Assistant Examiner* — Colin J Cattanach
(74) *Attorney, Agent, or Firm* — Sughrue Mion, PLLC (57) ABSTRACT

Provided is a vehicle lamp configured such that light emitted from a light emitting element (30) and incident from an incident portion (22e) formed on a top surface (22c) of a plate-like light guide (22B) is reflected toward a front end surface (22a) of the plate-like light guide (22B) by a first reflecting portion (22f) formed on a bottom surface (22d) of the plate-like light guide (22B). At that time, the incident portion (22e) is positioned on a step-up surface (22c1) formed to protrude from a general portion (22c0) of the top surface (22c). Further, the first reflecting portion (22f) is formed such that its upper end edge (22f1) is located closer to the step-up surface (22c1) than the general portion (22c0)
(Continued)

of the top surface (22c). In this way, a wide reflecting area of the first reflecting portion (22f) can be secured.

6 Claims, 8 Drawing Sheets

(51) Int. Cl.
    *F21Y 115/10*    (2016.01)
    *F21S 41/24*    (2018.01)
    *F21S 41/20*    (2018.01)
    *F21V 7/00*    (2006.01)
    *B60Q 3/64*    (2017.01)
    *B60Q 1/00*    (2006.01)
    *F21S 43/241*    (2018.01)
    *B60Q 3/62*    (2017.01)
    *F21V 8/00*    (2006.01)

(52) U.S. Cl.
    CPC ............... *B60Q 3/64* (2017.02); *F21S 41/24* (2018.01); *F21S 41/285* (2018.01); *F21S 43/241* (2018.01); *F21V 7/0091* (2013.01); *F21Y 2115/10* (2016.08); *G02B 6/0001* (2013.01); *G02B 6/002* (2013.01); *G02B 6/0011* (2013.01); *G02B 6/0013* (2013.01); *G02B 6/0015* (2013.01); *G02B 6/0018* (2013.01); *G02B 6/0033* (2013.01); *G02B 6/0035* (2013.01); *G02B 6/0045* (2013.01); *G02B 6/0073* (2013.01); *G02B 6/0078* (2013.01); *G02B 6/0091* (2013.01)

(56) References Cited

U.S. PATENT DOCUMENTS

| | | | |
|---|---|---|---|
| 7,322,729 B2 * | 1/2008 | Nagabuchi | G02B 6/0018 362/327 |
| 8,814,391 B2 * | 8/2014 | Koh | G02B 6/0021 313/512 |
| 2005/0111235 A1 | 5/2005 | Suzuki et al. | |
| 2012/0218772 A1 * | 8/2012 | Mitsuhashi | G02B 6/0045 362/516 |
| 2013/0003399 A1 | 1/2013 | de Lamberterie | |
| 2014/0146554 A1 * | 5/2014 | Giraud | F21S 43/14 362/511 |
| 2014/0177255 A1 * | 6/2014 | Gebauer | F21S 43/239 362/516 |
| 2014/0204600 A1 * | 7/2014 | Bungenstock | F21S 43/239 362/511 |
| 2015/0003092 A1 * | 1/2015 | Gebauer | G02B 6/0018 362/511 |
| 2015/0003094 A1 | 1/2015 | Gebauer et al. | |
| 2015/0247613 A1 * | 9/2015 | Doha | G02B 6/0018 362/507 |
| 2017/0089540 A1 * | 3/2017 | Sagna | B60Q 1/38 |

FOREIGN PATENT DOCUMENTS

| | | |
|---|---|---|
| EP | 2 796 772 A2 | 10/2014 |
| EP | 2 818 791 A1 | 12/2014 |
| FR | 2 996 224 A | 4/2012 |
| FR | 3 026 816 A1 | 4/2016 |
| JP | 59-8846 U | 1/1984 |
| JP | 2016-91825 A | 5/2016 |

OTHER PUBLICATIONS

Written Opinion dated Sep. 5, 2017 by the International Searching Authority in counterpart International Patent Application No. PCT/JP2017/020986 (PCT/ISA/237).
Search Report dated Nov. 29, 2019 by the European Patent Office in counterpart European Patent Application No. 17819793.5.

\* cited by examiner

VEHICLE LAMP

TECHNICAL FIELD

The disclosure relates to a vehicle lamp including a plate-like light guide that is arranged so as to extend substantially in a front and rear direction of the vehicle lamp.

BACKGROUND ART

Conventionally, a vehicle lamp such as a tail lamp or a clearance lamp, which adopts a plate-like light guide as a component thereof, is known.

For example, Patent Document 1 discloses a vehicle lamp configured such that light emitted from a light emitting element is incident on a plate-like light guide arranged so as to extend substantially in a front and rear direction of the vehicle lamp from an incident portion formed in a first plate surface.

In the vehicle lamp disclosed in Patent Document 1, a reflecting portion for reflecting incident light from the incident portion toward a front end surface of the plate-like light guide is formed on a second plate surface of the plate-like light guide opposite to the first plate surface.

CITATION LIST

Patent Document

Patent Document 1: US-A-2014/0146554

DISCLOSURE OF INVENTION

Problems to be Solved by Invention

In the vehicle lamp disclosed in the Patent Document 1, since a reflection area of the reflecting portion is small, it is not easy to accurately perform the reflection control on the incident light from the incident portion.

The disclosure has been made in view of the above situations and an object thereof is to provide a vehicle lamp which is configured such that light emitted from a light emitting element is incident on a plate-like light guide arranged so as to extend substantially in a front and rear direction of the vehicle lamp from an incident portion formed on a first plate surface thereof and which is capable of accurately performing the reflection control on the incident light from the incident portion.

Means for Solving the Problems

The disclosure is intended to achieve the above object by devising a configuration of a plate-like light guide.

Specifically a vehicle lamp according to the disclosure includes a plate-like light guide disposed to extend substantially in a front and rear direction of the vehicle lamp, and a light emitting element disposed to cause light to be incident on the plate-like light guide from an incident portion formed on a first plate surface of the plate-like light guide, wherein a first reflecting portion which is configured to reflect incident light from the incident portion toward a front end surface of the plate-like light guide is formed on a second plate surface of the plate-like light guide opposite to the first plate surface, wherein a portion of the first plate surface where the incident portion is located is formed as a step-up surface protruding from a general portion of the first plate surface, and wherein the first reflecting portion is formed such that a peripheral end edge of the first reflecting portion on a side of the first plate surface is located closer to the step-up surface than the general portion of the first plate surface.

The type of the "light emitting element" is not particularly limited. For example, a light emitting diode or a laser diode or the like can be adopted.

The direction of the "first plate surface" is not particularly limited. For example, an upwardly facing plate surface or a downwardly facing plate surface or the like can be adopted.

A specific shape of the "first reflecting portion" is not particularly limited, so long as the first reflecting portion is formed such that its peripheral end edge on the side of the first plate surface is located closer to the step-up surface than the general portion of the first plate surface. At that time, the entire area of the peripheral end edge of the "first reflecting portion" on the side of the first plate surface is not necessarily located closer to the step-up surface than the general portion of the first plate surface.

Effects of Invention

The vehicle lamp according to the disclosure is configured in such a manner that the light emitted from the light emitting element and incident on the plate-like light guide arranged to extend substantially in the front and rear direction of the vehicle lamp from the incident portion formed on the first plate surface is reflected toward the front end surface by the first reflecting portion formed on the second plate surface opposite to the first plate surface. However, since the incident portion is located on the step-up surface formed to protrude from the general portion of the first plate surface, and the first reflecting portion is formed in such a manner that its peripheral end edge on the side of the first plate surface is located closer to the step-up surface than the general portion of the first plate surface, the following operational effects can be obtained.

That is, since the first reflecting portion is formed such that its peripheral end edge on the side of the first plate surface is located closer to the step-up surface than the general portion of the first plate surface, a wide reflection area thereof can be secured. Therefore, it is possible to accurately perform the reflection control on the incident light from the incident portion in the first reflecting portion.

As described above, according to the disclosure, in the vehicle lamp configured such that the light emitted from the light emitting element is incident on the plate-like light guide arranged to extend substantially in the front and rear direction of the vehicle lamp from the incident portion formed on the first plate surface, it is possible to accurately perform the reflection control on the incident light from the incident portion. Further, in this way, it is also possible to accurately perform the control on the light emitted from the front end surface of the plate-like light guide.

In the above configuration, a second reflecting portion which is configured to reflect the incident light from the incident portion toward a direction different from the front end surface may be formed on the second plate surface of the plate-like light guide, and a third reflecting portion which is configured to reflect light reflected from the second reflecting portion toward the front end surface may be formed on an end surface of the plate-like light guide located in the direction different from the front end surface. With this configuration, the following operational effects can be obtained.

That is, since more incident light from the incident portion can reach the front end surface, utilization efficiency of the light emitted from the light emitting element can be improved. Moreover, since the incident light from the incident portion can reach the front end surface over a wide range, it is possible to make the front end surface appear to emit light over a wide range.

In the above configuration, a plurality of sets of plate-like light guides and light emitting elements may be arranged side by side substantially in a direction intersecting with the front and rear direction of the vehicle lamp. At that time, the plate-like light guides in respective sets may be formed integrally with each other and the light emitting elements in respective sets may be supported on a common substrate. In this way, the plurality of sets of plate-like light guides and light emitting elements can be arranged in a space saving manner and with high positional accuracy.

In addition to adopting such a configuration, the step-up surfaces of the plate-like light guides in respective sets may be formed to be substantially flush with each other. In this way, the light emitting elements in respective sets can be more easily supported on the common substrate, and space saving can be further promoted.

In the above configuration, a plate-like extension portion which extends to be bent in a plate thickness direction of the plate-like light guide may be formed at a front end portion of the plate-like light guide, a front end surface of the plate-like light guide may have a reflecting surface configured to reflect reflected light from the reflecting portion toward the plate-like extension portion, and the plate-like extension portion may be configured such that reflected light from the reflecting surface is reflected by a rear surface of the plate-like extension portion and emitted from a front surface of the plate-like extension portion. In this way, the following operational effects can be obtained.

That is, it is possible to make the plate-like extension portion of the plate-like light guide appear to emit light over a wide range in a front view of the lamp, thereby securing a sufficient light emitting area.

EMBODIMENT FOR CARRYING OUT INVENTION

Hereinafter, embodiments of the disclosure will be described with reference to the drawings.

First, a first embodiment of the disclosure will be described.

Figure 1:
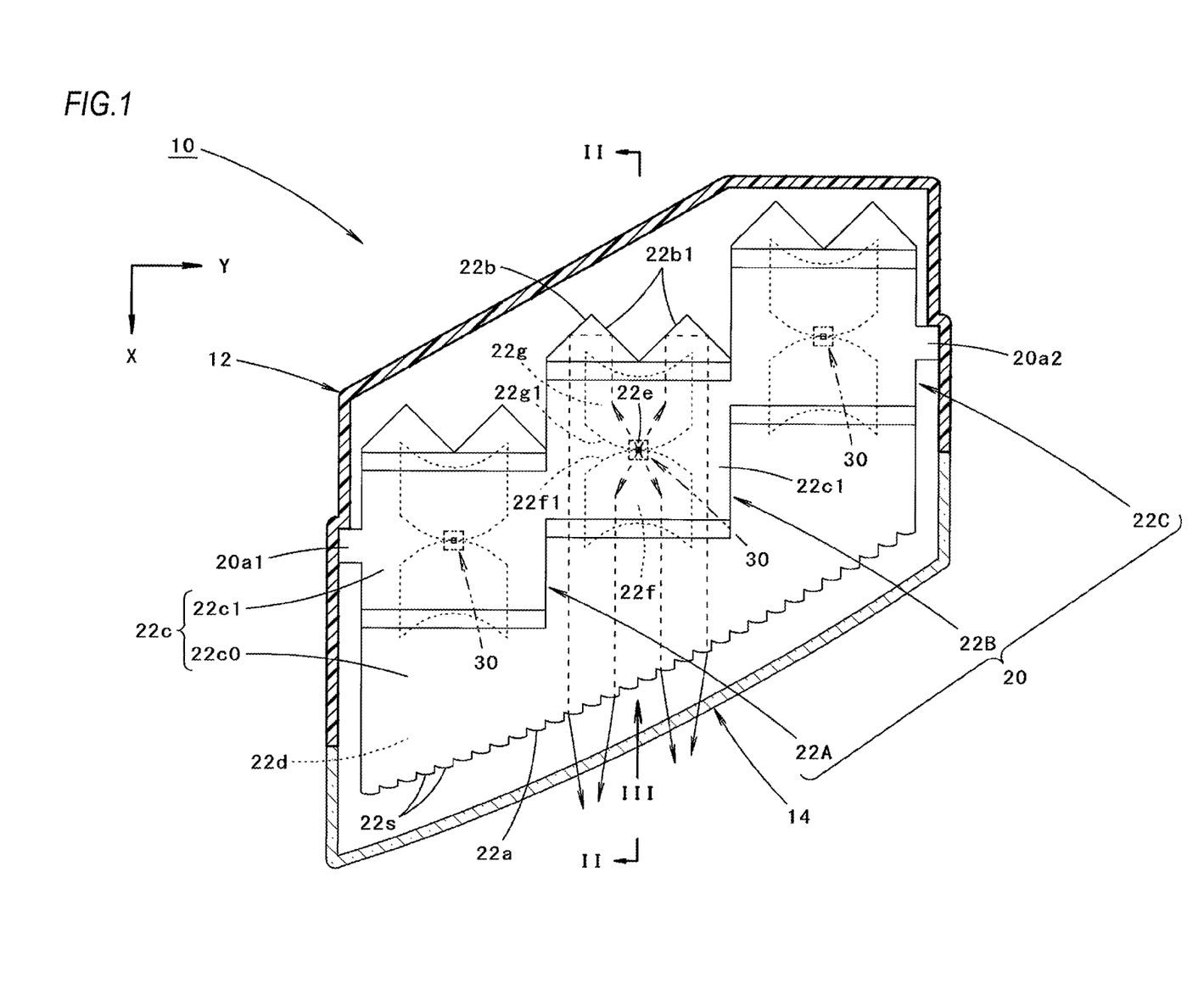
FIG. 1 is a plan sectional view showing a vehicle lamp according to a first embodiment of the disclosure.
Figure 2:
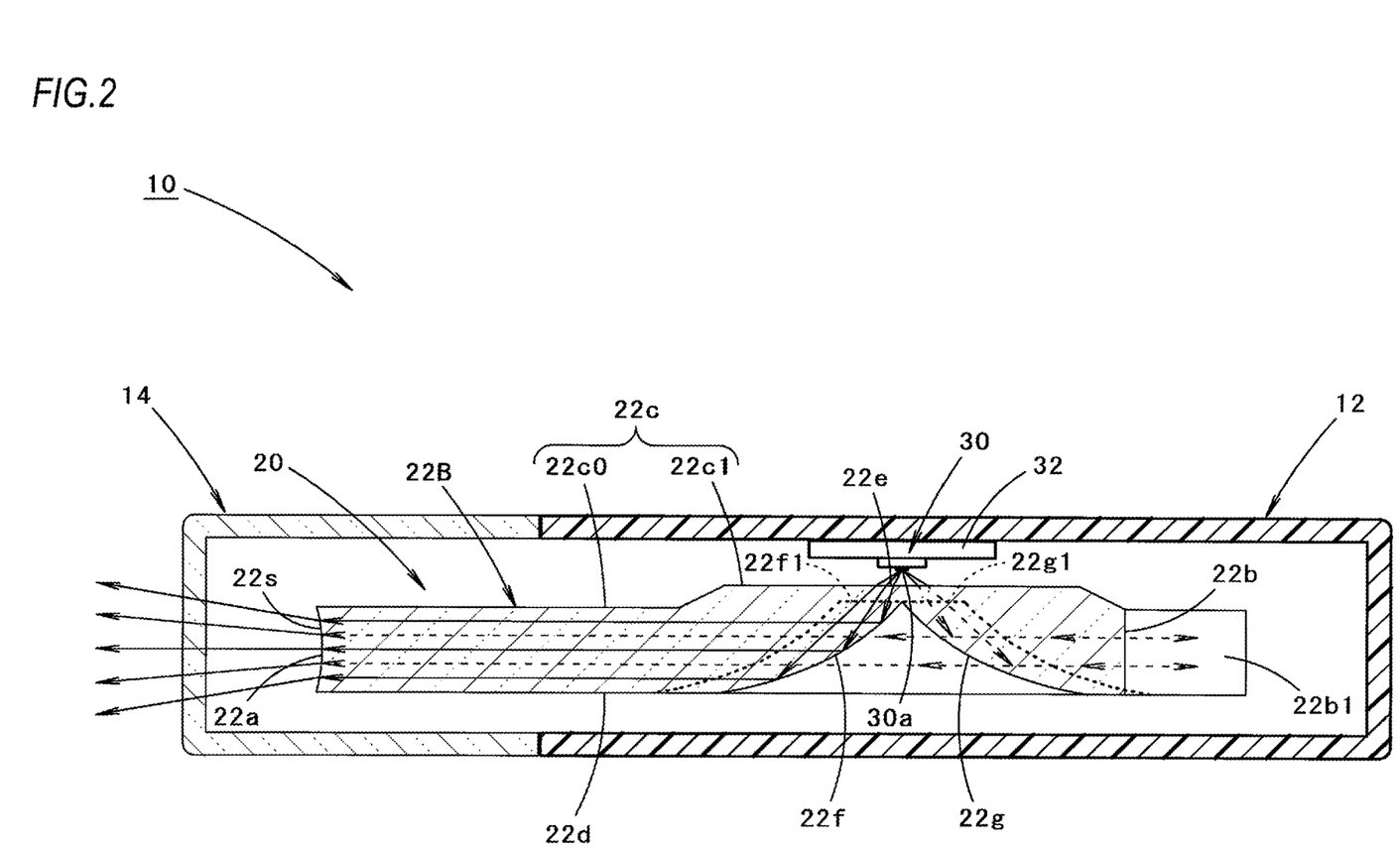
FIG. 2 is a sectional view taken along the line II-II in FIG. 1.

FIG. 1 is a plan sectional view showing a vehicle lamp 10 according to the present embodiment, and FIG. 2 is a sectional view taken along the line II-II in FIG. 1.

As shown in FIGS. 1 and 2, the vehicle lamp 10 according to the present embodiment is a clearance lamp provided in a left front end portion of a vehicle. The vehicle lamp 10 is configured such that a light guide unit 20 and three light emitting elements 30 are incorporated in a lamp chamber defined by a lamp body 12 and a plain translucent cover 14.

Meanwhile, for the vehicle lamp 10, in FIG. 1, a direction indicated by "X" is a "front direction" ("front direction" also for the vehicle), and a direction indicated by "Y" is a "left direction" ("left direction" also for the vehicle but a "right direction" as seen in a front view of the lamp) orthogonal to the "front direction."

The translucent cover 14 is formed so as to go around rearward from the inner side (right side) in a vehicle width direction toward the outer side in the vehicle width direction. At this time, the translucent cover 14 is formed so as to extend obliquely to the rear side along a convex curve slightly bulging toward the front side in a plan view.

Figure 3:
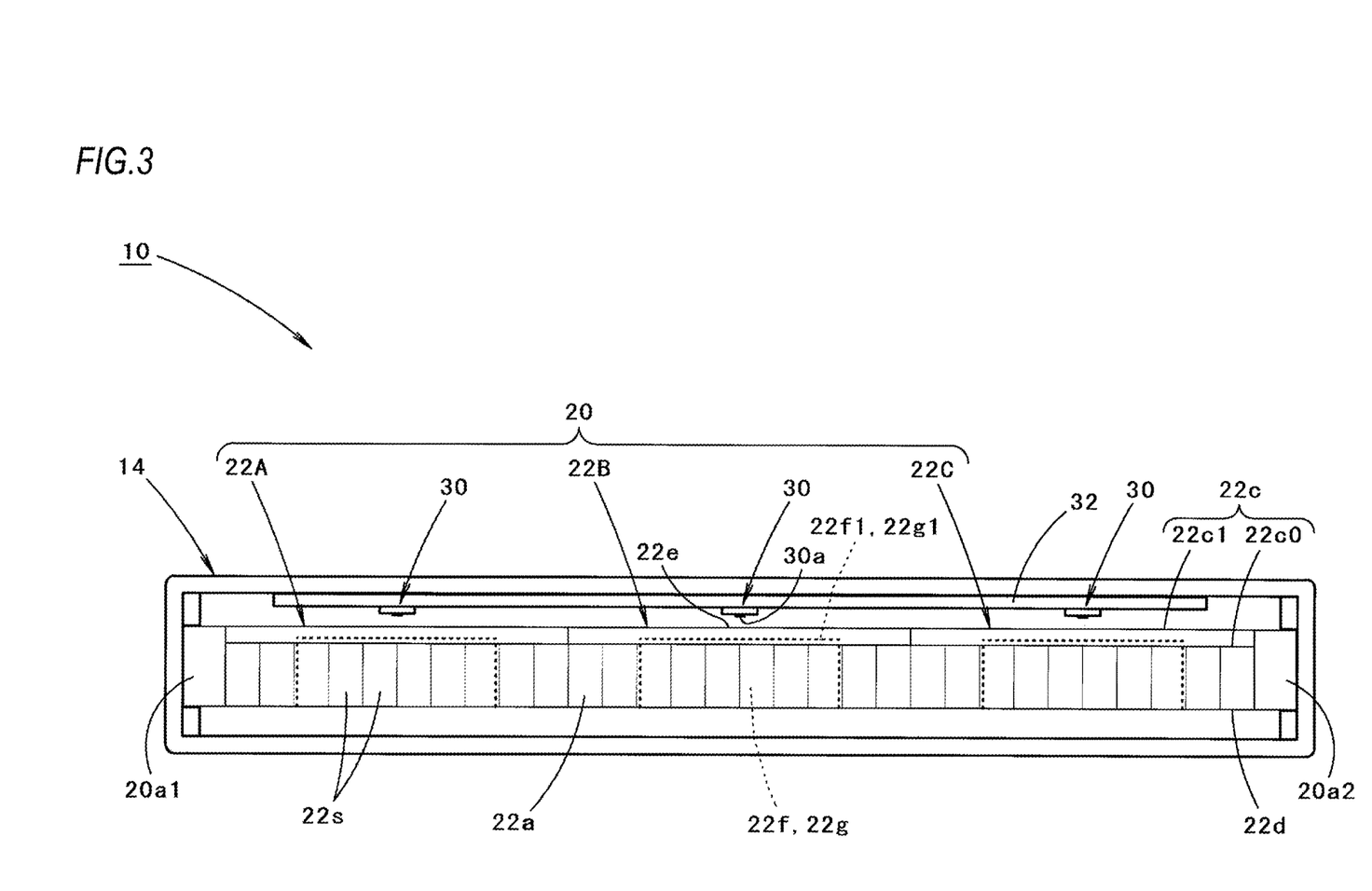
FIG. 3 is a view as seen in the direction of arrow III in FIG. 1, showing the vehicle lamp in a state where a translucent cover is removed.

FIG. 3 is a view as seen in the direction of arrow III in FIG. 1, showing the vehicle lamp 10 in a state where the translucent cover 14 is removed.

As shown also in FIG. 3, the light guide unit 20 is a transparent synthetic resin molded article made of an acrylic resin or the like. The light guide unit 20 is formed so as to extend in a flat plate shape along a horizontal plane.

In the light guide unit 20, three plate-like light guides 22A, 22B, 22C extending in a front and rear direction of the lamp are integrally formed in a state where they are arranged side by side in this order from the inner side in the vehicle width direction toward the outer side in the vehicle width direction.

Further, the light guide unit 20 is supported on the lamp body 12 at a flange portion 20$a$1 formed at its inner end portion in the vehicle width direction and a flange portion 20$a$2 formed at its outer end portion in the vehicle width direction.

All of the three light emitting elements 30 are white light emitting diodes and have the same configuration.

Each of the light emitting elements 30 is supported on the lamp body 12 via a common substrate 32 extending along a horizontal plane in a state where its light emitting surface 30$a$ faces downward on the upper side of the light guide unit 20.

As shown in FIG. 1, each of the plate-like light guides 22A to 22C is formed such that its front end surface 22$a$ is inclined rearward from the inner side in the vehicle width direction toward the outer side in the vehicle width direction so as to correspond to the wraparound shape of the translucent cover 14.

Therefore, the rearward inclination angles of the front end surfaces 22$a$ of the plate-like light guides 22A to 22C gradually increase in this order, but other configurations thereof are the same as each other.

Thus, in the following, the configuration of the second plate-like light guide 22B from the inner side in the vehicle width direction will be described.

Figure 4:
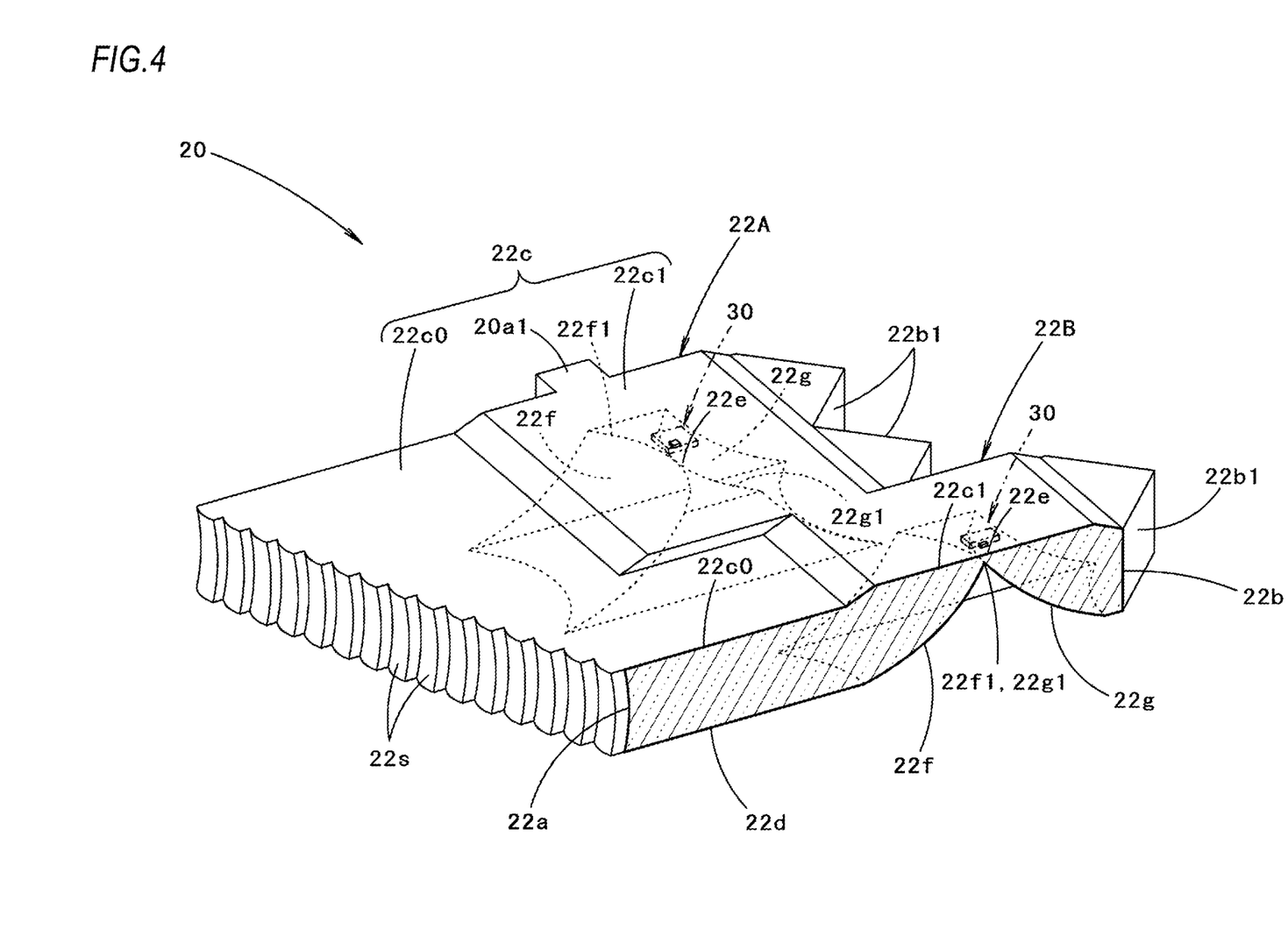
FIG. 4 is a sectional perspective view showing a light guide unit of the vehicle lamp in a vertical section at the same position as in FIG. 2.

FIG. 4 is a sectional perspective view showing the light guide unit 20 in a vertical section at the same position as in FIG. 2.

As shown also in FIG. 4, a rear portion of a top surface 22c of the plate-like light guide 22B is formed as a step-up surface 22c1 protruding upward from another general portion 22c0.

The step-up surface 22c1 is configured by a horizontal plane parallel to the general portion 22c0 and has a rectangular outer shape in a plan view. Further, the step-up surface 22c1 is connected to the general portion 22c0 via inclined surfaces extending in the front and rear direction at both front and rear end edges thereof.

The step-up surface 22c1 of the plate-like light guide 22B is connected with and flush with the step-up surface 22c1 of the plate-like light guide 22A at its front end portion. The step-up surface 22c1 of the plate-like light guide 22B is connected with and flush with the step-up surface 22c1 of the plate-like light guide 22C at its rear end portion.

Each of the light emitting elements 30 is arranged such that the light emitting surface 30a thereof is located in the upper vicinity of the center position on the step-up surface 22c1. In this way, the central portion of the step-up surface 22c1 constitutes an incident portion 22e for allowing light emitted from the light emitting element 30 to be incident on the plate-like light guide 22B.

A pair of first and second reflecting portions 22f, 22g on the front and rear sides for reflecting light emitted from the light emitting element 30 and incident on the plate-like light guide 22B from the incident portion 22e is formed on the rear portion of a bottom surface 22d of the plate-like light guide 22B.

The first reflecting portion 22f located on the front side is configured to totally reflect, as substantially parallel light, a part of light emitted from the light emitting element 30 and incident on the plate-like light guide 22B toward the front of the lamp.

In order to realize this configuration, the first reflecting portion 22f is formed so as to extend substantially in the shape of a paraboloid of revolution from the position directly below the center position of the incident portion 22e (i.e., the position directly below the light emitting center of the light emitting element 30) toward the front of the lamp. At this time, the first reflecting portion 22f is formed so that its upper end edge 22f1 is located in the lower vicinity of the step-up surface 22c1 of the top surface 22c (i.e., so that it extends above the general portion 22c0).

The width of the first reflecting portion 22f in the right and left direction is set to a value slightly larger than the half of the plate-like light guide 22B in the right and left direction.

On the other hand, the second reflecting portion 22g located on the rear side is configured to totally reflect, as substantially parallel light, a part of light emitted from the light emitting element 30 and incident on the plate-like light guide 22B from the incident portion 22e toward the direction just behind it.

In order to realize this configuration, the second reflecting portion 22g has a reflecting surface shape symmetrical with respect to the first reflecting portion 22f in the front and rear direction and its upper end edge 22g1 is located in the lower vicinity of the step-up surface 22c1.

A rear end surface 22b of the plate-like light guide 22B is located on the rear side of the step-up surface 22c1. On the rear end surface 22b, a pair of third reflecting portions 22b1 on the right and left sides for reflecting the light reflected from the second reflecting portion 22g toward the front is formed over the entire width of the rear end surface 22b.

Each of the third reflecting portions 22b1 is formed in a right-angled prism surface shape extending in the upper and lower direction in a horizontal sectional shape of a right-angled isosceles triangle shape. An upper end surface of the third reflecting portion 22b is formed to be flush with the general portion 22c0 of the top surface 22c. Further, each of the third reflecting portions 22b1 totally reflects the light reflected from the second reflecting portion 22g twice to make it substantially parallel light going toward the front of the lamp.

The front end surface 22a of the plate-like light guide 22B is divided into a plurality of strip-like regions formed in a stepwise manner in a plan view. A diffusion lens element 22s is allocated to each strip-like region. Each diffusion lens element 22s has a horizontal sectional shape set as a convex curve shape and a vertical sectional shape set as a concave curve shape.

Further, on the front end surface 22a, the reflected light from the first reflecting portion 22f and the reflected light from each of the third reflecting portions 22b1 reaching the front end surface 22a are emitted forward as light diffusing in the upper and lower direction and the right and left direction by a plurality of diffusion lens elements 22s.

Next, operational effects of the present embodiment will be described.

The vehicle lamp 10 according to the present embodiment is configured in such a manner that the light emitted from the light emitting element 30 and incident on the plate-like light guide 22B arranged to extend along the horizontal plane in the front and rear direction of the lamp from the incident portion 22e formed on the top surface 22c (first plate surface) is reflected toward the front end surface 22a by the first reflecting portion 22f formed on the bottom surface 22d (second plate surface). The incident portion 22e is located on the step-up surface 22c1 formed to protrude from the general portion 22c0 of the top surface 22c, and the first reflecting portion 22f is formed in such a manner that the upper end edge 22f1 (peripheral end edge on the side of the first plate surface) is located on the upper side (on the side of the step-up surface 22c1) of the general portion 22c0 of the top surface 22c. Therefore, the following operational effects can be obtained.

That is, since the first reflecting portion 22f is formed such that the upper end edge 22f1 is located on the upper side of the general portion 22c0 of the top surface 22c, a wide reflection area thereof can be secured. Therefore, it is possible to accurately perform the reflection control on the incident light from the incident portion 22e in the first reflecting portion 79f.

As described above, according to the present embodiment, in the vehicle lamp 10 configured such that the light emitted from the light emitting element 30 is incident on the plate-like light guide 22B arranged to extend in the front and rear direction of the lamp from the incident portion 22e formed on the top surface 22c, it is possible to accurately perform the reflection control on the incident light from the incident portion 22e. Further, in this way, it is also possible to accurately perform the control on the light emitted from the front end surface 22a of the plate-like light guide 22B.

Moreover, in the present embodiment, the second reflecting portion 22g for reflecting the incident light from the incident portion 22e toward the direction just behind it (the direction different from the front end surface 22a) is formed on the bottom surface 22d of the plate-like light guide 22B. In addition, the pair of third reflecting portions 22b1 on the right and left sides for reflecting the light reflected from the second reflecting portion 22g toward the front end surface 22a is formed on the rear end surface 22b (the end surface located in the direction different from the front end surface 22a) of the plate-like light guide 22B. Therefore, the following operational effects can be obtained.

That is, since more incident light from the incident portion 22e can reach the front end surface 22a, utilization efficiency of the light emitted from the light emitting element 30 can be improved. Moreover, since the incident light from the incident portion 22e can reach the front end surface 22a over a wide range, it is possible to make the front end surface 22a appear to emit light over a wide range.

At that time, since the second reflecting portion 22g is also formed such that the upper end edge 22g1 is located on the upper side of the general portion 22c0 of the top surface 22c, a wide reflection area thereof can be secured. Therefore, it is possible to accurately perform the reflection control on the incident light from the incident portion 22e also in the second reflecting portion 22g.

Further, in the present embodiment, three sets of plate-like light guides 22A to 22C and light emitting elements 30 are arranged side by side in the vehicle width direction. However, the plate-like light guides 22A to 22C in respective sets are integrally formed as the light guide unit 20, and the light emitting elements 30 in respective sets are supported on the common substrate 32. Therefore, the three sets of plate-like light guides 22A to 22C and light emitting elements 30 can be arranged in a space saving manner and with high positional accuracy.

At that time, since the step-up surfaces 22c1 of the plate-like light guides 22A to 22C in respective sets are formed to be flush with each other, the light emitting elements 30 in respective sets can be more easily supported on the common substrate 32, and space saving can be further promoted.

In the first embodiment, the first reflecting portion 22f is configured to reflect the incident light from the incident portion 22e as substantially parallel light. However, the first reflecting portion 22f may be configured to reflect the incident light as diffused light.

In the first embodiment, the second and third reflecting portions 22g, 22b1 are configured to reflect the incident light from the incident portion 22e as substantially parallel light by the combination thereof. However, the second and third reflecting portions 22g, 22b1 may be configured to reflect the incident light as diffused light by the combination thereof.

In the first embodiment, the incident portions 22e of the plate-like light guides 22A to 22C are formed on the side of the top surface 22c. However, the incident portions 22e of the plate-like light guides 22A to 22C may be formed on the side of the bottom surface 22d.

In the first embodiment, the three sets of plate-like light guides 22A to 22C and light emitting elements 30 are arranged side by side in the vehicle width direction. However, two or less sets or four or more sets of plate-like light guides 22A to 22C and light emitting elements 30 may be arranged.

In the first embodiment, the light guide unit 20 is formed so as to extend in a flat plate shape. However, the light guide unit 20 may be formed to have a thickness which changes depending on the part thereof.

In the first embodiment, the light guide unit 20 is formed so as to extend along the horizontal plane. However, the light guide unit 20 may be formed so as to extend in other directions.

In the first embodiment, the vehicle lamp 10 is configured as a clearance lamp provided in a left front end portion of a vehicle. However, in addition to the clearance lamp, by adopting the same configuration as in the first embodiment to a daytime running lamp, a tail lamp, a stop lamp, a turn signal lamp or a room lamp or the like regardless of functions or places in a vehicle, the same operational effects as those of the first embodiment can be obtained.

Next, a second embodiment of the disclosure will be described.

Figure 5:
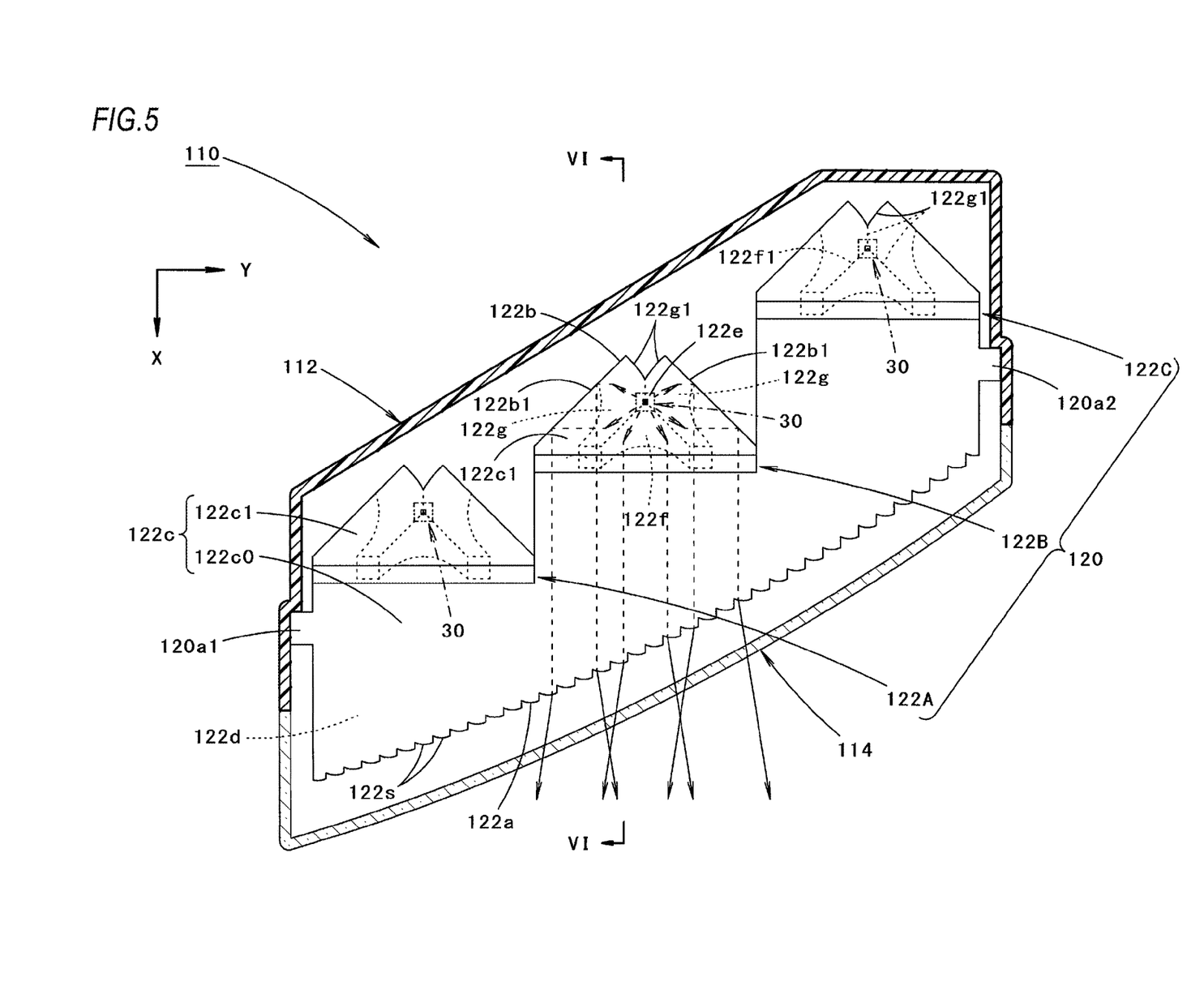
FIG. 5 is a plan sectional view showing a vehicle lamp according to a second embodiment of the disclosure.
Figure 6:
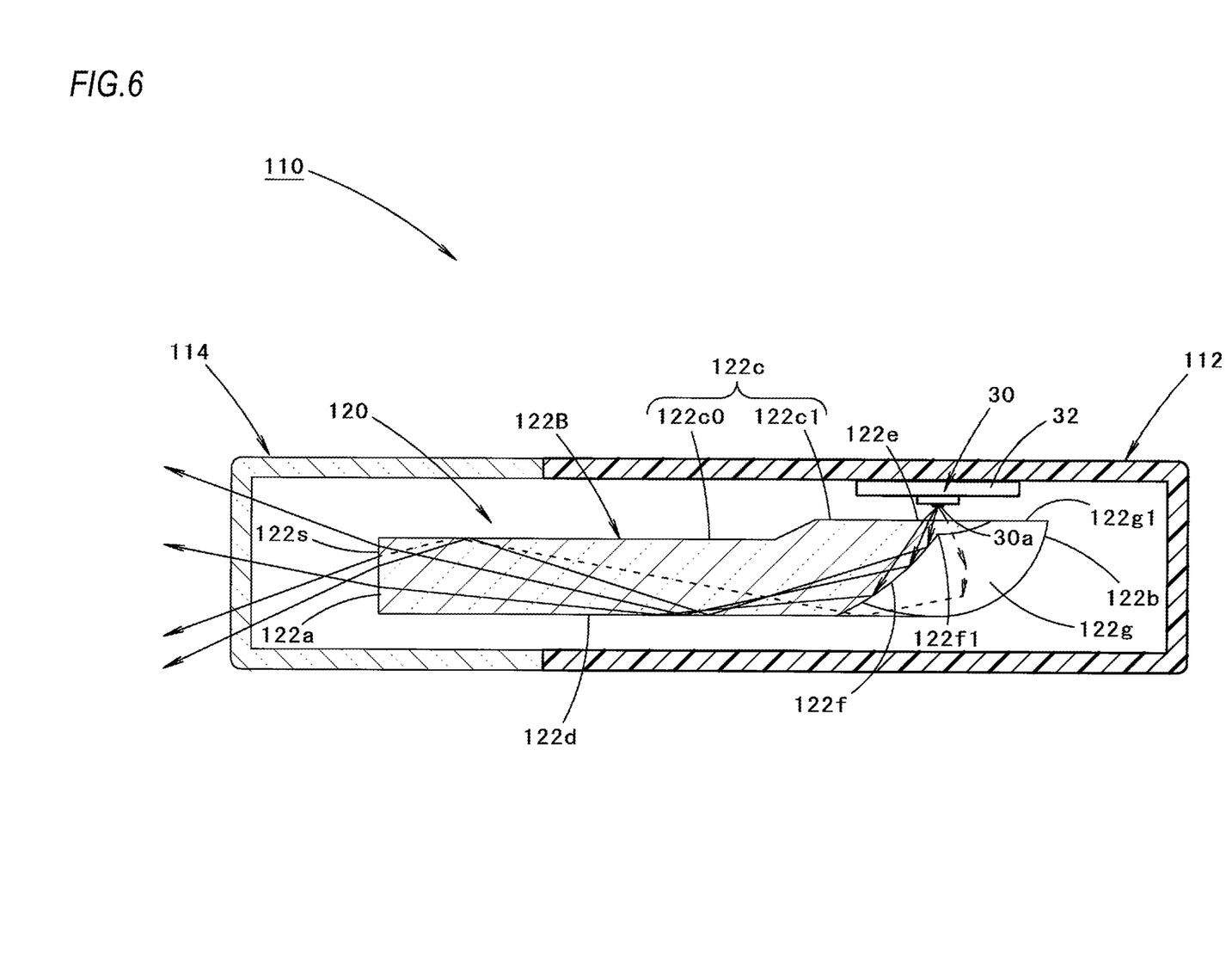
FIG. 6 is a sectional view taken along the line VI-VI in FIG. 5.

FIG. 5 is a plan sectional view showing a vehicle lamp 110 according to the present embodiment, and FIG. 6 is a sectional view taken along the line VI-VI in FIG. 5.

As shown in FIGS. 5 and 6, a basic configuration of the present embodiment is similar to that of the first embodiment. However, the second embodiment is different from the first embodiment in the configuration of a light guide unit 120, and thus, the shapes of a lamp body 112 and a plain translucent cover 114.

Similar to the light guide unit 20 of the first embodiment, the light guide unit 120 is a transparent synthetic resin molded article made of an acrylic resin or the like. The light guide unit 120 is formed so as to extend in a flat plate shape along a horizontal plane.

In the light guide unit 120, three plate-like light guides 122A, 122B, 122C extending in the front and rear direction of the lamp are integrally formed in a state where they are arranged side by side in this order from the inner side in the vehicle width direction toward the outer side in the vehicle width direction.

Further, the light guide unit 120 is supported on the lamp body 112 at a flange portion 120a1 formed at its inner end portion in the vehicle width direction and a flange portion 120a2 formed at its outer end portion in the vehicle width direction.

Similar to the first embodiment, also in the present embodiment, three light emitting elements 30 are supported on the lamp body 112 via the common substrate 32 extending along the horizontal plane in a state where the light emitting surfaces 30a thereof face downward on the upper side of the light guide unit 120.

Each of plate-like light guides 122A to 122C is formed such that its front end surface 122a is inclined rearward from the inner side in the vehicle width direction toward the outer side in the vehicle width direction so as to correspond to the wraparound shape of the translucent cover 14.

Therefore, the rearward inclination angles of the front end surfaces 122a of the plate-like light guides 122A to 122C gradually increase in this order, but other configurations thereof are the same as each other.

Thus, in the following, the configuration of the second plate-like light guide 122B from the inner side in the vehicle width direction will be described.

A rear portion of a top surface 122c of the plate-like light guide 122B is formed as a step-up surface 122c1 protruding upward from another general portion 122c0.

The step-up surface 122c1 is configured by a horizontal plane parallel to the general portion 122c0 and has an outer shape protruding rearward in a shape in which an apex portion of a right-angled isosceles triangle has two peaks in a plan view. Further, the step-up surface 122c1 is connected to the general portion 122c0 via an inclined surface extending in the front and rear direction at a front end edge thereof. The step-up surface 122c1 extends to a rear end surface 122b of the plate-like light guide 122B.

The light emitting element 30 is arranged so that the light emitting surface 30a thereof is located in the upper vicinity of a position somewhat closer to the rear center of the step-up surface 122c1. In this way, the portion somewhat closer to the rear center of the step-up surface 122c1 constitutes an incident portion 122e for allowing light emitted from the light emitting element 30 to be incident on the plate-like light guide 122B.

On a rear portion of a bottom surface 122d of the plate-like light guide 122B, a first reflecting portion 122f and a pair of second reflecting portions 122g on the right and left sides for reflecting light emitted from the light emitting element 30 and incident on the plate-like light guide 122B from the incident portion 122e are formed.

The first reflecting portion 122f is located on the front side of the light emitting element 30 and is configured to totally reflect a part of light emitted from the light emitting element 30 and incident on the plate-like light guide 122B toward the front of the lamp as substantially parallel light in a plan view and as substantially obliquely downwardly convergent light in a side view.

In order to realize this configuration, the first reflecting portion 122f is formed so as to extend in a substantially parabolic horizontal sectional shape and in a substantially elliptical vertical sectional shape from the position directly below the center position of the incident portion 122e (i.e., the position directly below the light emitting center of the light emitting element 30) toward the front of the lamp. At this time, the first reflecting portion 122f is formed so that a rear portion of its upper end edge 122f1 is located in the lower vicinity of the step-up surface 122c1 of the top surface 122c (i.e., so that it extends above the general portion 122c0).

The width of the first reflecting portion 122f in the right and left direction is set to a value slightly smaller than the half of the plate-like light guide 122B in the right and left direction.

On the other hand, the pair of second reflecting portions 122g on the right and left sides is formed in a bilaterally symmetrical positional relationship on the rear side of the first reflecting portion 122f. Each of the second reflecting portions 122g is configured to totally reflect, as substantially parallel light in a plan view and substantially obliquely downwardly convergent light in a side view, a part of light emitted from the light emitting element 30 and incident on the plate-like light guide 122B from the incident portion 122e toward the direction orthogonal to the front and rear direction of the lamp. In order to realize this, each of the second reflecting portions 122g has a reflecting surface shape obtained by rotating the first reflecting portion 122f.

A part of the rear end surface 122b of the plate-like light guide 122B is configured by an upper end edge 122g1 of each second reflecting portion 122g, and the remaining portion thereof is configured by a pair of third reflecting portions 122b1 on the right and left sides for reflecting the light reflected from the second reflecting portion 122g toward the front.

In the upper end edge 122g1 of each second reflecting portion 122g, the portion constituting the rear end surface 122b is formed so as to extend in a parabolic shape in a plan view, but the boundary line portion between the second reflecting portions 122g and the boundary line portion between the second reflecting portion and the first reflecting portion 122f are formed in a linear shape in a plan view.

On the other hand, each of the third reflecting portions 122b1 is formed in a vertical plane shape along an oblique side of a right-angled isosceles triangle. Further, each of the third reflecting portions 122b1 is configured to totally reflect the reflected light from the second reflecting portion 122g as substantially parallel light toward the front of the lamp in a plan view and totally reflect the reflected light obliquely forward and downward in a side view.

The front end surface 122a of the plate-like light guide 122B is divided into a plurality of strip-like regions formed in a stepwise manner in a plan view. A diffusion lens element 122s is allocated to each strip-like region. Each diffusion lens element 122s has a horizontal sectional shape set as a convex curve shape and a vertical sectional shape set as a linear shape.

Further, on the front end surface 122a, the reflected light from the first reflecting portion 122f and the reflected light from the third reflecting portions 122b1 reaching the front end surface 122a are emitted forward as light diffusing in the upper and lower direction and the right and left direction by a plurality of diffusion lens elements 122s.

Next, operational effects of the present embodiment will be described.

The vehicle lamp 110 according to the present embodiment is configured in such a manner that the light emitted from the light emitting element 30 and incident on the plate-like light guide 122B arranged to extend along the horizontal plane in the front and rear direction of the lamp from the incident portion 122e formed on the top surface 122c (first plate surface) is reflected toward the front end surface 122a by the first reflecting portion 122f formed on the bottom surface 122d (second plate surface). The incident portion 122e is located on the step-up surface 122c1 formed to protrude from the general portion 122c0 of the top surface 122c, and the first reflecting portion 122f is formed in such a manner that the rear portion of the upper end edge 122f1 (peripheral end edge on the side of the first plate surface) is located on the upper side (on the side of the step-up surface 122c1) of the general portion 122c0 of the top surface 122c. Therefore, the following operational effects can be obtained.

That is, since the first reflecting portion 122f is formed such that the rear portion of the upper end edge 122f1 is located on the upper side of the general portion 122c0 of the top surface 122c, a wide reflection area thereof can be secured. Therefore, it is possible to accurately perform the reflection control on the incident light from the incident portion 122e in the first reflecting portion 122f.

As described above, according to the present embodiment, in the vehicle lamp 110 configured such that the light emitted from the light emitting element 30 is incident on the plate-like light guide 122B arranged to extend in the front and rear direction of the lamp from the incident portion 122e formed on the top surface 122c, it is possible to accurately perform the reflection control on the incident light from the incident portion 122e. Further, in this way, it is also possible to accurately perform the control on the light emitted from the front end surface 122a of the plate-like light guide 122B.

Moreover, in the present embodiment, the pair of second reflecting portions 122g on the right and left sides for reflecting the incident light from the incident portion 122e toward the direction orthogonal to the front and rear direction of the lamp (the direction different from the front end surface 122a) is formed on the bottom surface 122d of the plate-like light guide 122B. In addition, the pair of third reflecting portions 122b1 on the right and left sides for reflecting the light reflected from the second reflecting portions 122g toward the front end surface 122a is formed on the rear end surface 122b (the end surface located in the direction different from the front end surface 122a) of the plate-like light guide 122B. Therefore, the following operational effects can be obtained.

That is, since more incident light from the incident portion 122e can reach the front end surface 122a, utilization efficiency of the light emitted from the light emitting element 30 can be improved. Moreover, since the incident light from the incident portion 122e can reach the front end surface 122a over a wide range, it is possible to make the front end surface 122a appear to emit light over a wide range.

At that time, since the second reflecting portions 122g are also formed such that parts of the upper end edges 22g1 thereof are located on the upper side of the general portion 122c0 of the top surface 122c, a wide reflection area thereof can be secured. Therefore, it is possible to accurately perform the reflection control on the incident light from the incident portion 122e in the second reflecting portions 122g.

Furthermore, in the present embodiment, the first reflecting portion 122f and the second reflecting portions 122g are configured to totally reflect the incident light from the incident portion 122e as substantially obliquely downwardly convergent light, so that the light diffusing in the upper and lower direction can reach the front end surface 122a. Therefore, the emission light from the front end surface 122a can be diffused in the upper and lower direction despite the fact that the vertical sectional shape of each diffusion lens element 122s is set in a linear shape.

Further, in the present embodiment, three sets of plate-like light guides 122A to 122C and light emitting elements 30 are arranged side by side in the vehicle width direction. However, the plate-like light guides 122A to 122C in respective sets are integrally formed as the light guide unit 120, and the light emitting elements 30 in respective sets are supported on the common substrate 32. Therefore, the three sets of plate-like light guides 122A to 122C and light emitting elements 30 can be arranged in a space saving manner and with high positional accuracy.

At that time, since the step-up surfaces 122c1 of the plate-like light guides 122A to 122C in respective sets are formed to be flush with each other, the light emitting elements 30 in respective sets can be more easily supported on the common substrate 32, and space saving can be further promoted.

Next, a third embodiment of the disclosure will be described.

Figure 7:
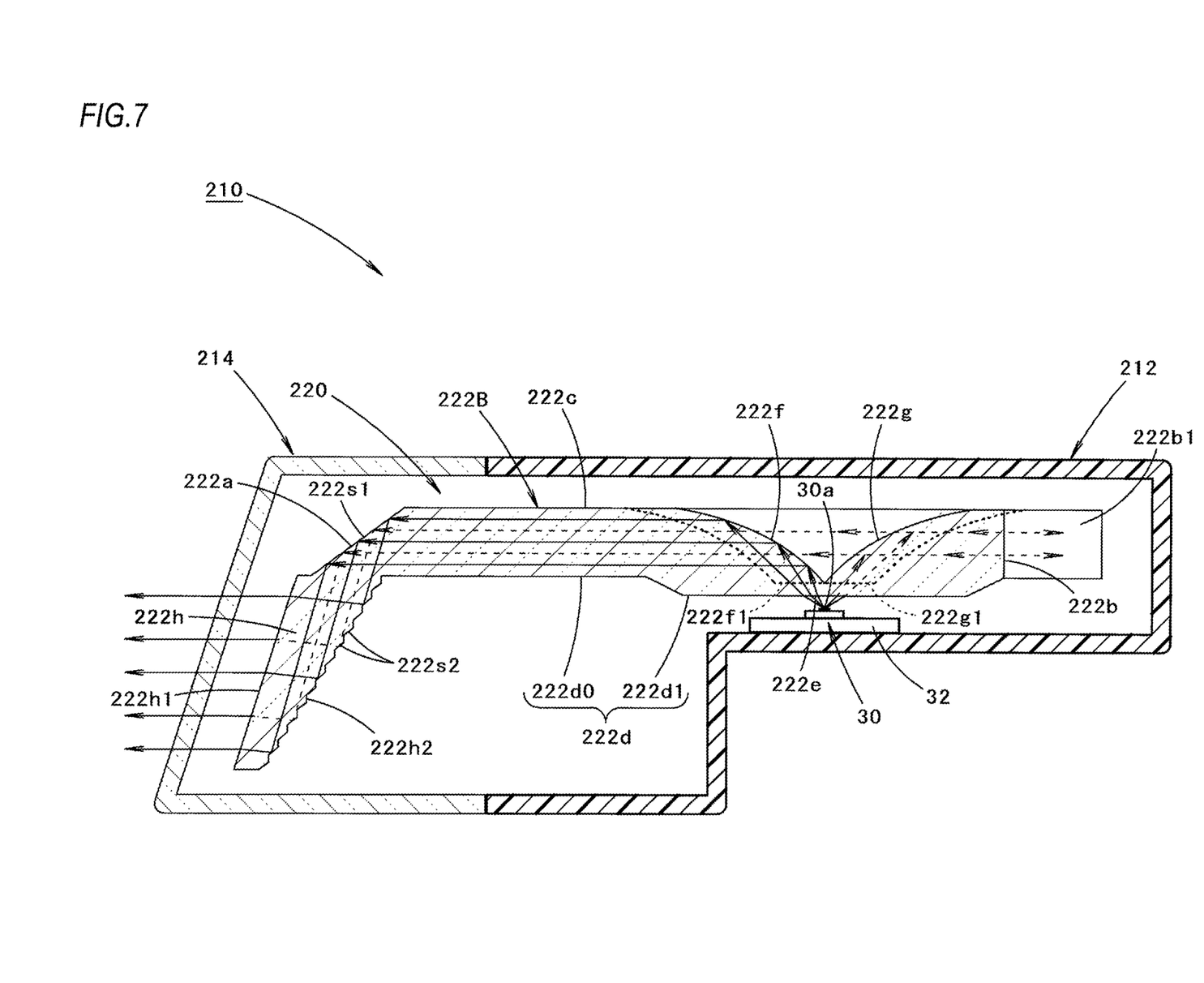
FIG. 7 is a view similar to FIG. 2, showing a vehicle lamp according to a third embodiment of the disclosure.
Figure 8:
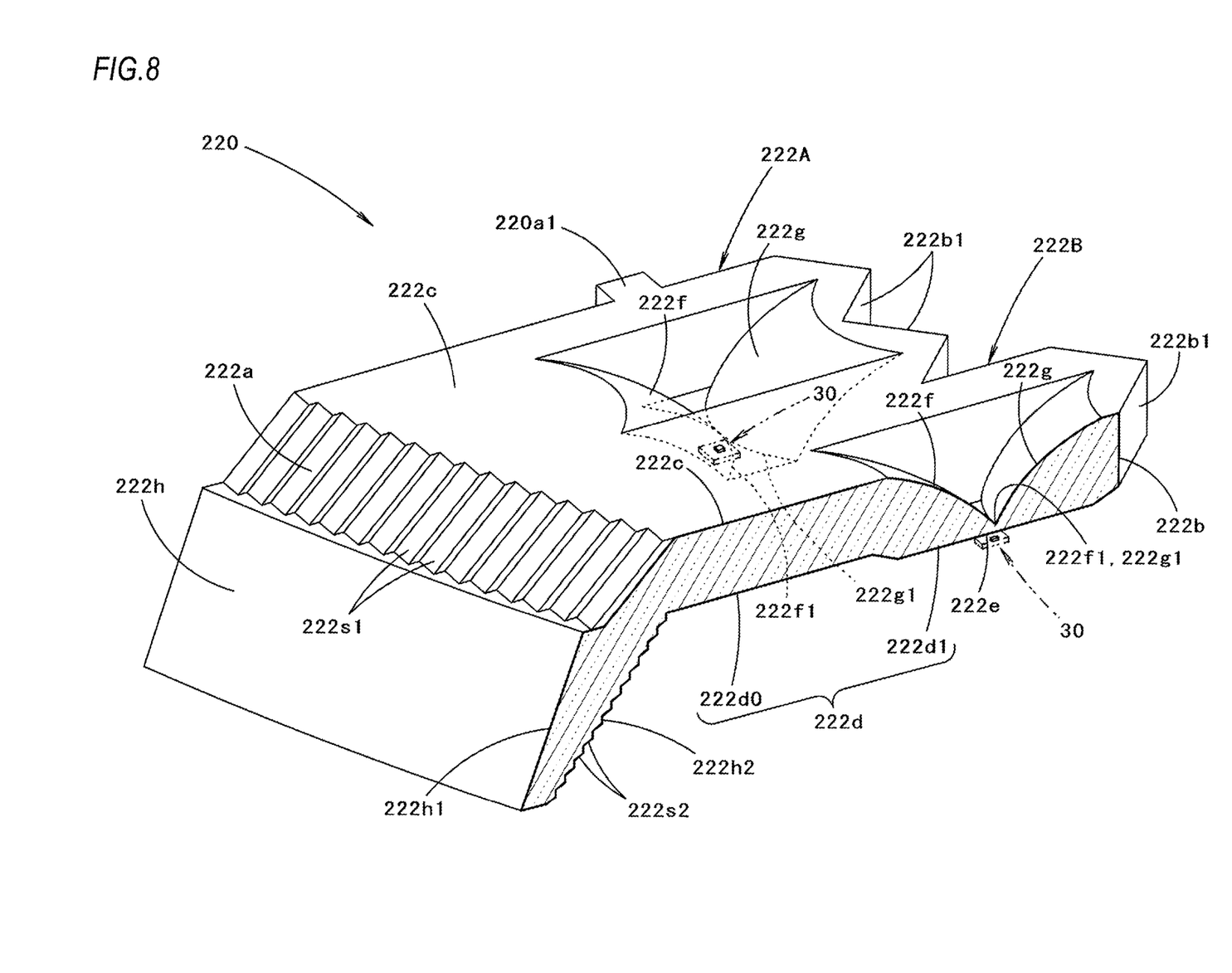
FIG. 8 is a view similar to FIG. 4, showing a light guide unit according to the third embodiment of the disclosure.

FIG. 7 is a view similar to FIG. 2, showing a vehicle lamp 210 according to the present embodiment, and FIG. 8 is a view similar to FIG. 4.

As shown in FIGS. 7 and 8, a basic configuration of the present embodiment is similar to that of the first embodiment. However, the third embodiment is different from the first embodiment in the configuration of a light guide unit 220 and the arrangement of the light emitting elements 30, and thus, the shapes of a lamp body 212 and a plain translucent cover 214.

In the light guide unit 220, three plate-like light guides (only plate-like light guides 222A and 222B are shown in FIG. 8) extending in the front and rear direction of the lamp are integrally formed in a state where they are arranged side by side in this order from the inner side in the vehicle width direction toward the outer side in the vehicle width direction.

Further, the light guide unit 220 is supported on the lamp body 212 at a flange portion 220a1 formed at its inner end portion in the vehicle width direction and a flange portion (not shown) formed at its outer end portion in the vehicle width direction.

In the following, the configuration of the second plate-like light guide 222B from the inner side in the vehicle width direction will be described.

The plate-like light guide 222B has a shape obtained by turning the plate-like light guide 22B of the first embodiment upside down. That is, in the plate-like light guide 222B, a rear portion of a bottom surface 222d is formed as a step-up surface 222d1 protruding downward from another general portion 222d0.

Further, a plate-like extension portion 222h extending to be bent downward is formed at a front end portion of the plate-like light guide 222B.

Each of the light emitting elements 30 is supported on the lamp body 212 via the common substrate 32 in a state where its light emitting surface 30a faces upward on the lower side of the plate-like light guide 222B.

At that time, each of the light emitting elements 30 is arranged such that the light emitting surface 30a thereof is located in the lower vicinity of the center position of the step-up surface 222d1. In this way, the central portion of the step-up surface 222d1 constitutes an incident portion 222e for allowing light emitted from the light emitting element 30 to be incident on the plate-like light guide 222B.

A pair of first and second reflecting portions 222f, 222g on the front and rear sides for reflecting light emitted from the light emitting element 30 and incident on the plate-like light guide 222B from the incident portion 222e is formed on a rear portion of a top surface 222c of the plate-like light guide 222B.

The shapes of the first and second reflecting portions 222f, 222g are similar to those of the first and second reflecting portions 22f, 22g of the first embodiment. That is, the first and second reflecting portions 222f, 222g are formed such that lower end edges 222f1, 222g1 thereof are located in the upper vicinity of the step-up surface 222d1 of the bottom surface 222d (i.e., so that it extends below the general portion 222d0).

A pair of third reflecting portions 222b1 on the right and left sides for reflecting light reflected from the second reflecting portion 222g toward the front is formed on a rear end surface 222b of the plate-like light guide 222B. The shapes of the third reflecting portions 222b1 are similar to those of the third reflecting portions 22b1 of the first embodiment.

The plate-like extension portion 222h is formed so as to extend obliquely downward and forward from a front end portion of the plate-like light guide 222B.

A front end surface 222a of the plate-like light guide 222B has a plurality of reflecting surfaces 222s1 for reflecting the reflected light from the first reflecting portion 222f and the reflected light from the third reflecting portions 222b1 reaching the front end surface 222a toward the plate-like extension portion 222h.

The plurality of reflecting surfaces 222s1 are arranged as vertically elongated strip-like regions in a stepwise manner in the vehicle width direction.

Each of the reflecting surfaces 222s1 is configured as a planar inclined surface which is displaced forward from an upper end edge toward a lower end edge thereof. Light reaching the reflecting surfaces 222s1 is totally reflected toward the plate-like extension portion 222h.

The plate-like extension portion 222h is formed so that its width in the front and rear direction becomes narrower toward a tip portion (i.e., a lower end portion) thereof. On a rear surface 222h2 of the plate-like extension portion 222h, a plurality of reflecting elements 222s2 for totally reflecting the reflected light from the reflecting surfaces 222s1 toward the front is formed in a stepwise manner in the upper and lower direction. On the other hand, a front surface 222h1 of the plate-like extension portion 222h is formed of a smooth curved surface having a linear vertical sectional shape and extending in a convex curve shape in the vehicle width direction.

Next, operational effects of the present embodiment will be described.

In the vehicle lamp 210 according to the present embodiment, the plate-like light guide 222B has a shape obtained by turning the plate-like light guide 22B of the first embodiment upside down and the light emitting elements 30 are arranged in a state where the light emitting elements 30 of the first embodiment are turned upside down. Therefore, it is possible to obtain the same operational effects as in the first embodiment.

Further, in the present embodiment, since the plate-like extension portion 222h extending to be bent downward (in the plate thickness direction of the plate-like light guide 222B) is formed at the front end portion of the plate-like light guide 222B, it is possible to make the plate-like extension portion 222h appear to emit light over a wide range, thereby securing a sufficient light emitting area.

In the third embodiment, the front surface 222h1 of the plate-like extension portion 222h is formed of a smooth curved surface. However, a plurality of diffusion lens elements or the like may be formed on the front surface 222h1.

In the third embodiment, the plate-like extension portion 222h extends to be bent downward. However, the plate-like extension portion 222h may extend to be bent upward.

Meanwhile, the numerical values represented as the specifications in each of the above embodiments are merely examples, and it goes without saying that these numerical values may be appropriately set to different values.

Further, the disclosure is not limited to the configurations described in each of the above embodiments, and it is possible to adopt a configuration with various other modifications.

The present application is based on Japanese Patent Application No. 2016-129240 filed on Jun. 29, 2016, the contents of which are incorporated herein by reference.

The invention claimed is:

1. A vehicle lamp comprising:
a plate-like light guide disposed to extend substantially in a front direction and a rear direction of the vehicle lamp; and
a light emitting element disposed to cause light to be incident on the plate-like light guide from an incident portion formed on a first plate surface of the plate-like light guide, the first plate surface being an upper surface of the plate-like light guide,
wherein a first reflecting portion, which is configured to reflect incident light from the incident portion in the front direction and toward a front end surface of the plate-like light guide, is formed on a second plate surface of the plate-like light guide opposite to the first plate surface, the second plate surface being a lower surface of the plate-like light guide,
wherein an area other than the first reflecting portion of the second plate surface is constructed as a single plane,
wherein the first plate surface has a general portion that is directly opposite to the area other than the first reflecting portion of the second plate surface with respect to an up direction and a down direction and is constructed as a single plane extending parallel to the second plate surface;
wherein a portion of the first plate surface where the incident portion is located is formed as a step-up surface protruding from the general portion of the first plate surface, and
wherein the first reflecting portion is formed such that a peripheral end edge of the first reflecting portion on a side of the first plate surface is located closer to the step-up surface than the general portion of the first plate surface, and the peripheral end edge of the first reflecting portion on a side of the first plate surface is located above the general portion of the first plate surface with respect to the up direction and the down direction;
wherein a second reflecting portion, which is configured to reflect the incident light from the incident portion in the rear direction and toward a rear end surface of the plate-like light guide, is formed on the second plate surface of the plate-like light guide, and
wherein a third reflecting portion, which is configured to reflect the light reflected from the second reflecting portion in the front direction and toward the front end surface, is formed on the rear end surface of the plate-like light guide;
wherein each of the first plate surface and the second plate surface is parallel to the front direction and to the rear direction;
wherein the area other than the first reflecting portion of the second plate surface constructed as the single plane extends directly from the first reflecting portion.

2. The vehicle lamp according to claim 1,
wherein a plurality of sets of plate-like light guides and light emitting elements are arranged side by side substantially in a direction intersecting with the front and rear direction,
wherein the plate-like light guides in respective sets are formed integrally with each other, and
wherein the light emitting elements in respective sets are supported on a common substrate.

3. The vehicle lamp according to claim 2,
wherein the step-up surfaces of the plate-like light guides in respective sets are formed to be substantially flush with each other.

4. The vehicle lamp according to claim 1,
wherein a plate-like extension portion which extends to be bent in a plate thickness direction of the plate-like light guide is formed at a front end portion of the plate-like light guide,
wherein a front end surface of the plate-like light guide comprises a reflecting surface configured to reflect reflected light from the first reflecting portion toward the plate-like extension portion, and
wherein the plate-like extension portion is configured such that reflected light from the reflecting surface is reflected by a rear surface of the plate-like extension portion and emitted from a front surface of the plate-like extension portion.

5. The vehicle lamp according to claim 1, wherein the incident portion formed on the first plate surface of the plate-like light guide is a flat surface.

6. The vehicle lamp according to claim 1, wherein the area other than the first reflecting portion of the second plate surface constructed as the single plane is a lowermost surface of the plate-like light guide.

* * * * *